(12) United States Patent
Ishioka et al.

(10) Patent No.: US 11,332,195 B2
(45) Date of Patent: May 17, 2022

(54) VEHICLE FRONT PORTION STRUCTURE

(71) Applicant: TOYOTA JIDOSHA KABUSHIKI KAISHA, Aichi-ken (JP)

(72) Inventors: Hirotaka Ishioka, Toyota (JP); Taichi Minei, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 121 days.

(21) Appl. No.: 16/773,988

(22) Filed: Jan. 28, 2020

(65) Prior Publication Data

US 2020/0269927 A1 Aug. 27, 2020

(30) Foreign Application Priority Data

Feb. 26, 2019 (JP) .............................. JP2019-033236

(51) Int. Cl.
*B62D 25/08* (2006.01)
*G02B 27/01* (2006.01)
*B60K 35/00* (2006.01)

(52) U.S. Cl.
CPC ....... *B62D 25/081* (2013.01); *G02B 27/0149* (2013.01); *B60K 35/00* (2013.01); *B60K 2370/1529* (2019.05)

(58) Field of Classification Search
CPC .. B62D 25/081; B62D 25/082; B62D 25/145; B62D 25/088; B62D 25/14; B62D 25/04; B62D 27/02; B62D 25/24; B62D 27/023; B62D 25/08
USPC ........... 296/192, 96.21, 187.09, 208, 187.04, 296/193.02, 193.11, 203.02; 180/219, 180/229, 89.1, 89.17
See application file for complete search history.

(56) References Cited

U.S. PATENT DOCUMENTS

| 8,414,057 | B2 * | 4/2013 | Yamagishi | ........... B62D 25/081 296/70 |
| 8,973,980 | B2 * | 3/2015 | Mildner | ............... B62D 29/041 296/193.09 |
| 9,573,627 | B2 * | 2/2017 | Sanjo | ................... B62D 25/145 |
| 2009/0066116 | A1 * | 3/2009 | Kuroita | ................ B62D 25/081 296/193.09 |

(Continued)

FOREIGN PATENT DOCUMENTS

| DE | 3419002 A1 | 11/1985 |
| DE | 102014017449 A1 | 6/2015 |
| JP | H7-309254 A | 11/1995 |

(Continued)

*Primary Examiner* — D Glenn Dayoan
*Assistant Examiner* — Sunsurraye Westbrook
(74) *Attorney, Agent, or Firm* — Hauptman Ham, LLP

(57) ABSTRACT

A pair of reinforcing members that extend along the extending direction of the cowl panel and that face each other in the vehicle width direction are attached to the cowl panel, and the pair of reinforcing members in the cowl panel are attached to the cowl panel. A head-up display device is provided at a position corresponding to between the two. That is, since the head-up display device can also act as a reinforcing member, the reinforcing structure is continuously provided in the extending direction of the cowl panel. Therefore, the bending rigidity of the cowl panel can be enhanced. Thereby, securing of the installation space of a head-up display apparatus and the enhanced of the bending rigidity of a cowl panel can be made compatible.

12 Claims, 6 Drawing Sheets

(56) References Cited

U.S. PATENT DOCUMENTS

2015/0232128 A1    8/2015    Naoi et al.

FOREIGN PATENT DOCUMENTS

| JP | 2010-64709 A | 3/2010 |
| WO | 2015033642 A1 | 3/2015 |

* cited by examiner

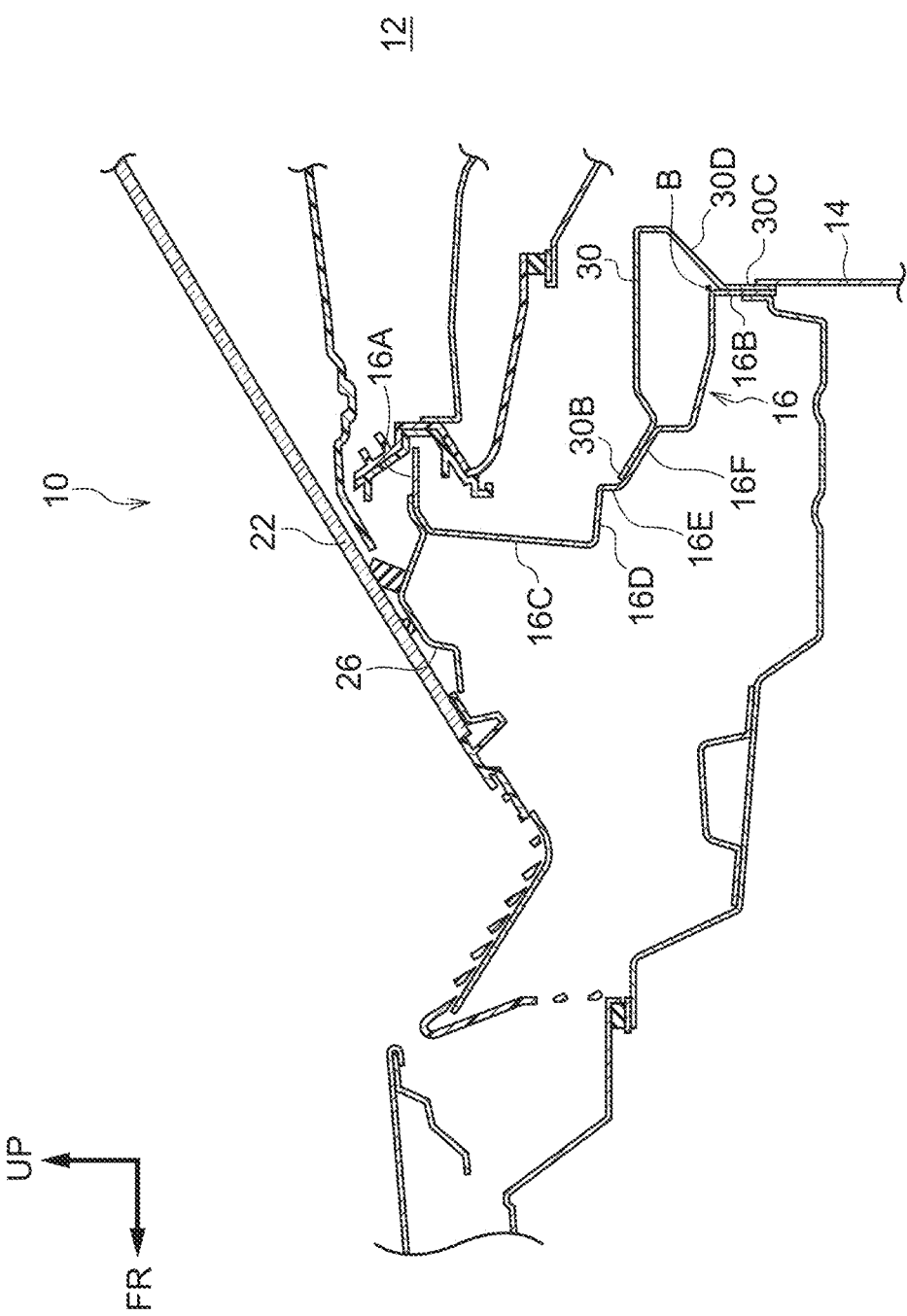

VEHICLE FRONT PORTION STRUCTURE

CROSS-REFERENCE TO RELATED APPLICATION

This application is based on and claims priority under 35 USC 119 from Japanese Patent Application No. 2019-033236 filed on Feb. 26, 2019, the disclosure of which is incorporated by reference herein.

BACKGROUND

Technical Field

The present disclosure relates to a vehicle front portion structure.

Related Art

Japanese Patent Application Laid-Open (JP-A) No. 7-309254 discloses an invention relating to a cowl structure of a vehicle. In this cowl structure, a cowl panel is coupled to an upper end portion of a dash panel that is provided inside the instrument panel and divides a vehicle compartment and a vehicle front portion of the vehicle. The cowl panel has a cowl bottom surface extending in the vehicle width direction, and the cowl bottom surface functions as a beam so that the bending rigidity of the cowl panel with respect to the load acting along the vehicle width direction is enhanced.

In recent years, the number of vehicles adopting a head-up display device that projects information on the windshield glass is increasing. Due to the fact that a head-up display device has a configuration that projects an image on the windshield glass, it is provided inside the instrument panel provided on the vehicle lower side of the windshield glass. For this reason, the installation space for an in-vehicle apparatus, such as a head-up display device, is limited by the cowl panel provided inside the instrument panel. In addition, when the reinforcing member is provided on the cowl panel for the purpose of further enhancing the rigidity of the vehicle body, the installation space for the in-vehicle apparatus is further limited. Accordingly, the above-described technology has room for improvement in this regard.

SUMMARY

In view of the above-described circumstances, an object of the present disclosure is to provide a vehicle front portion structure capable of securing an installation space for the in-vehicle apparatus while enhancing the bending rigidity of the cowl panel.

A vehicle front portion structure according to a first aspect includes a cowl panel extending substantially in the vehicle width direction along a lower edge of a windshield glass provided at a front portion of a vehicle interior, and a pair of reinforcing members that are attached to the cowl panel, that extend along an extending direction of the cowl panel and that are disposed opposite each other in the vehicle width direction, and an in-vehicle apparatus that is provided at a position on the cowl panel between the pair of reinforcing members.

According to the first aspect, the pair of reinforcing members are attached to the cowl panel, the pair of reinforcing members being provided along the extending direction of the cowl panel and disposed opposite each other in the vehicle width direction. The in-vehicle apparatus is provided at a position corresponding to between the pair of reinforcing members. That is, an installation space for the in-vehicle apparatus can be secured between the pair of reinforcing members, and the pair of reinforcing members are disposed so as to extend continuously in the substantially vehicle width direction via the in-vehicle apparatus. Therefore, the reinforcing structure is continuously provided along the extending direction of the cowl panel. This enhances the bending rigidity of the cowl panel.

The vehicle front portion structure according to a second aspect is the vehicle front portion structure according to the first aspect, wherein the pair of reinforcing members form a closed cross-sectional structure with the cowl panel in a vehicle side view, and both ends of the reinforcing members, along a substantially vehicle width direction, are respectively joined to the cowl panel.

According to the second aspect, both end portions, along the substantially vehicle width direction, of the reinforcing member respectively form closed cross-sectional structures with the cowl panel in the vehicle side view and the vehicle front view by being respectively joined to the cowl panel. Therefore, deformation of the cowl panel to which the reinforcing member is attached can be suppressed.

The vehicle front portion structure according to a third aspect is the vehicle front portion structure according to the first or second aspect, wherein a ridge line extending substantially in the vehicle width direction is formed on the cowl panel, and each reinforcing member is attached to the cowl panel so as to cover at least a part of the ridge line.

According to the third aspect, the reinforcement member covers at least a part of the ridge line of the cowl panel, so that deformation of the ridge line can be suppressed. Therefore, the load input to the cowl panel can be efficiently transmitted to other members along the ridge line having relatively higher bending rigidity compared to other members. Therefore, the load input to the cowl panel can be efficiently dispersed throughout the vehicle body.

The vehicle front portion structure according to a fourth aspect is the vehicle front portion structure according to any one of the first to third aspects, wherein each end portion, along the vehicle width direction, of the in-vehicle apparatus is connected to an adjacent one of the pair of reinforcing members.

According to the fourth aspect, since the pair of reinforcing members are directly connected to each other substantially in the vehicle width direction via the in-vehicle apparatus, the reinforcing member and the in-vehicle apparatus are continuously provided along the extending direction of the cowl panel. This further enhances the bending rigidity of the cowl panel.

The vehicle front portion structure according to a fifth aspect is the vehicle front portion structure according to any one of the first to fourth aspects, wherein the in-vehicle apparatus includes a case upper portion that forms a vehicle upper side portion of the in-vehicle apparatus, and a case lower portion that forms a vehicle lower side portion of the in-vehicle apparatus, and a rigidity of the case upper portion with respect to a load from above the vehicle is set lower than that of the case lower portion.

According to the fifth aspect, the case upper portion forming the vehicle upper side portion of the in-vehicle apparatus is less rigid with respect to the load from above the vehicle than the case lower portion forming the vehicle lower side portion of the in-vehicle apparatus. Therefore, when a collision body such as a pedestrian collides with an in-vehicle apparatus from the upper side of the vehicle, the case upper portion near the collision body side is deformed with a low load and absorbs the collision load. This lowers the collision load received by the colliding body.

The vehicle front portion structure according to a sixth aspect is the vehicle front portion structure according to the fifth aspect, wherein, in the in-vehicle apparatus, each end portion of the case lower portion in the vehicle width direction is connected to an adjacent one of the pair of reinforcing members.

According to the sixth aspect, since each end portion in the vehicle width direction of the case lower portion of the in-vehicle apparatus is connected to the adjacent one of the pair of reinforcing members, the pair of reinforcing members are directly connected in the substantially vehicle width direction via a case lower portion whose rigidity against a load at the in-vehicle apparatus is increased with respect to the case upper portion. That is, the reinforcing member and the case lower part are continuously provided along the extending direction of the cowl panel. This enhances the bending rigidity of the cowl panel further.

The vehicle front portion structure according to a seventh aspect is the vehicle front portion structure according to the fifth or sixth aspect wherein, the case upper portion is displaced substantially toward the lower side of the vehicle when a predetermined load is input from the upper side of the vehicle.

According to the seventh aspect, when the predetermined load is input from the upper side of the vehicle, the case upper part is displaced substantially toward the lower side of the vehicle. Therefore, when the collision body collides with the in-vehicle apparatus from the upper side of the vehicle, the case upper portion close to the collision body is displaced substantially toward the lower side of the vehicle to absorb the collision load. This lowers the collision load received by the collision body.

The vehicle front portion structure according to the first aspect has an advantageous effect that it is possible to secure an installation space for the in-vehicle apparatus while simultaneously enhancing the bending rigidity of the cowl panel.

The vehicle front portion structure according to the second aspect has an advantageous effect that the bending rigidity of the cowl panel can be further enhanced.

The vehicle front portion structure according to the third aspect has an advantageous effect that the vehicle body rigidity can be enhanced to thereby enhance the NV (noise vibration) performance.

The vehicle front portion structure according to the fourth aspect has an advantageous effect that the bending rigidity of the cowl panel can be further enhanced while securing the installation space for the head-up display device.

The vehicle front portion structure according to the fifth and seventh aspects has an advantageous effect that the pedestrian protection performance can be enhanced.

The vehicle front portion structure according to the sixth aspect has an advantageous effect that the bending rigidity of the cowl panel can be further enhanced.

BRIEF DESCRIPTION OF THE DRAWINGS

FIG. 6 is an enlarged cross-sectional view showing a state cut along the line BB in FIG. 2.

DETAILED DESCRIPTION

Figure 1:
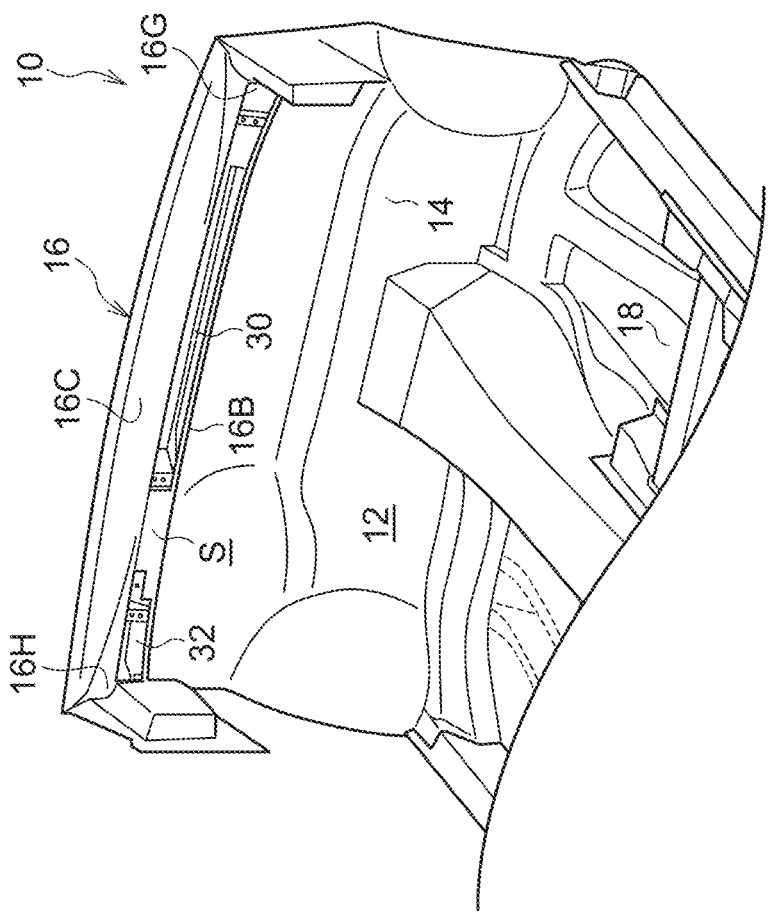
FIG. 1 is a schematic perspective view showing a state in which a vehicle body having a vehicle front portion structure according to an embodiment is viewed obliquely from a vehicle rear side.
Figure 1:
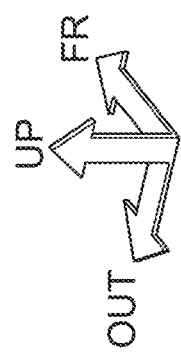

Hereinafter, an embodiment of a vehicle front portion structure according to the present disclosure will be described with reference to FIGS. 1 to 6. In each drawing, the same reference numerals are given to the same or equivalent components and parts. In addition, the dimensional ratios in the drawings are exaggerated for convenience of explanation, and may differ from actual ratios.

(Overall Structure)

As shown in FIG. 1, a vehicle front portion structure 10 is applied to a cowl panel 16 provided at an upper portion of a dash panel 14 that partitions a power unit room (not shown) that constitutes a vehicle front and a vehicle compartment 12. The dash panel 14 is made of sheet metal and is disposed with the plate thickness direction being substantially the vehicle front-rear direction. The lower end portion of the dash panel 14 is joined to the front end portion of the floor panel 18, and the floor panel 18 constitutes the lower surface of the vehicle compartment 12.

(Cowl Panel)

Figure 5:
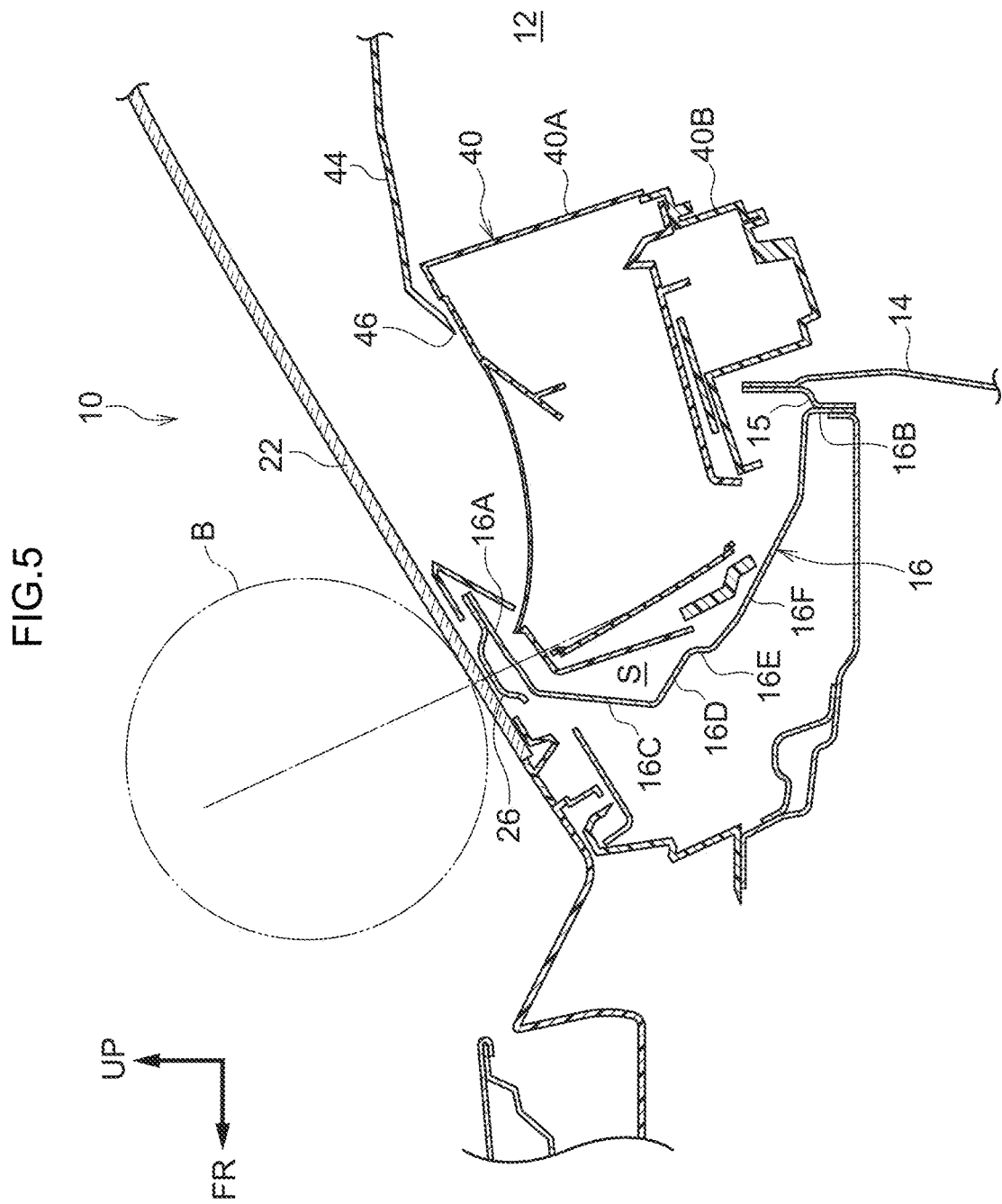
FIG. 5 is an enlarged cross-sectional view showing a state cut along line AA in FIG. 2.

The cowl panel 16 is made of sheet metal, extends substantially in the vehicle width direction and has a cross-sectional shape that is orthogonal to the longitudinal direction having substantially U-shape that opens toward the vehicle rear side as shown in FIG. 5 (details will be described later). The upper end wall portion 16A of the cowl panel 16 is inclined toward the vehicle upper side toward the vehicle rear side so as to be substantially parallel to the windshield glass 22. A cowl upper panel 26 adjacent to the windshield glass 22 is joined to the upper end wall portion 16A, and a clip or the like (not shown) provided on the windshield glass 22 is inserted into the cowl upper panel 26. In this way, the lower end portion of the windshield glass 22 is supported.

The lower end wall portion 16B of the cowl panel 16 is bent so that the thickness direction is substantially the vehicle front-rear direction. The upper end portion of the dash panel 14 is joined to the lower end wall portion 16B directly or via the joining member 15 from the vehicle rear side.

Between the upper end wall portion 16A and the lower end wall portion 16B of the cowl panel 16, a first component wall portion 16C, a second component wall portion 16D, a third component wall portion 16E, and a fourth component wall portion 16F are provided. The first component wall portion 16C has a plate thickness direction substantially in the vehicle front-rear direction, and extends from the lower end of the upper end wall portion 16A of the cowl panel 16 to the lower side of the vehicle.

The second component wall portion 16D has a plate thickness direction substantially in the vehicle vertical direction, and extends substantially from the lower end of the first component wall portion 16C to the vehicle rear side.

The plate thickness direction of the third component wall portion 16E is substantially the vehicle front-rear direction, and extends substantially toward the lower side of the vehicle from the rear end of the second component wall portion 16D.

The fourth component wall portion 16F has a plate thickness direction substantially the vehicle vertical direction, extends from the lower end of the third component wall portion 16E to the substantially rear side of the vehicle, and connects to the upper end of the lower end wall portion 16B of the cowl panel 16. The first component wall portion 16C, the second component wall portion 16D, the third component wall portion 16E, and the fourth component wall portion 16F described above are each formed continuously from one end portion of the cowl panel 16 to the other end portion substantially along the vehicle width direction and also formed so that the surface inclination and the like are appropriately different depending on their positions along the vehicle width direction (see FIG. 6).

(Reinforcing Member)

Figure 2:
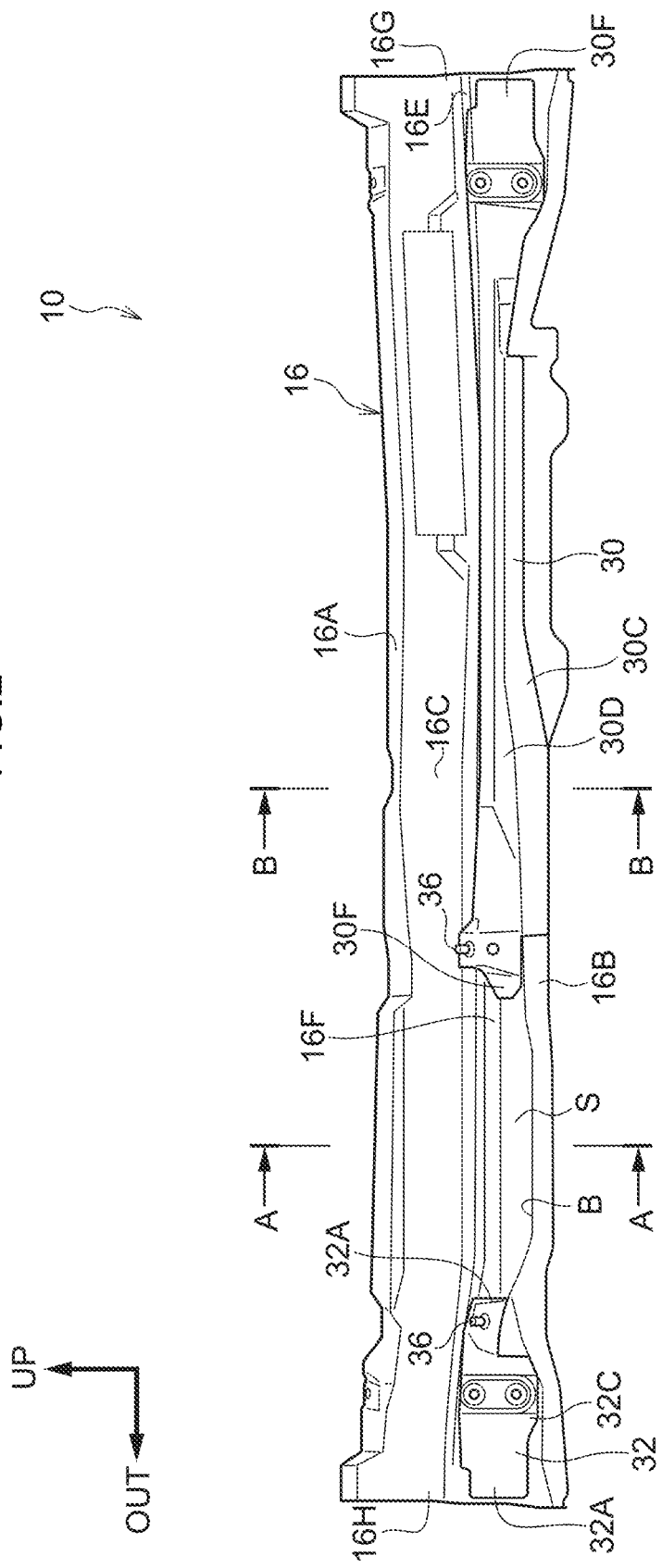
FIG. 2 is a rear view showing a state in which a cowl panel in the vehicle front portion structure according to the embodiment is viewed from the vehicle rear side.

As shown in FIG. 2, a pair of reinforcing members 30 and 32 are attached in the vehicle width direction to the surface of the cowl panel 16 on the vehicle rear side. The reinforcing member 30 extends from the end portion 16G on the right side in the vehicle width direction of the cowl panel 16 to a substantially central portion in the vehicle width direction, and is attached so as to cover, from the vehicle rear side, a fourth component wall portion 16F and a lower end wall portion 16B of the cowl panel 16. As shown in FIG. 6, the reinforcing member 30 has a front end portion 30B joined to a part of the fourth component wall portion 16F and a rear end portion 30C joined to the lower end wall portion 16B. Therefore, the reinforcing member 30 and the cowl panel 16 form a closed cross-sectional structure in a vehicle side view. That is, the reinforcing member 30 is provided so as to cover at least a part of the ridge line B between the fourth component wall portion 16F and the lower end wall portion 16B of the cowl panel 16. Further, the vehicle upper side of the rear end portion 30C of the reinforcing member 30 is formed with an inclined wall portion 30D that is inclined toward the vehicle upper side as one moves toward the vehicle rear side. Therefore, this inclined wall portion 30D facilitates the sealing material application operation from the inside of the vehicle compartment 12 to the joint portion between the rear end portion 30C, the cowl panel 16 and the dash panel 14.

Figure 3:
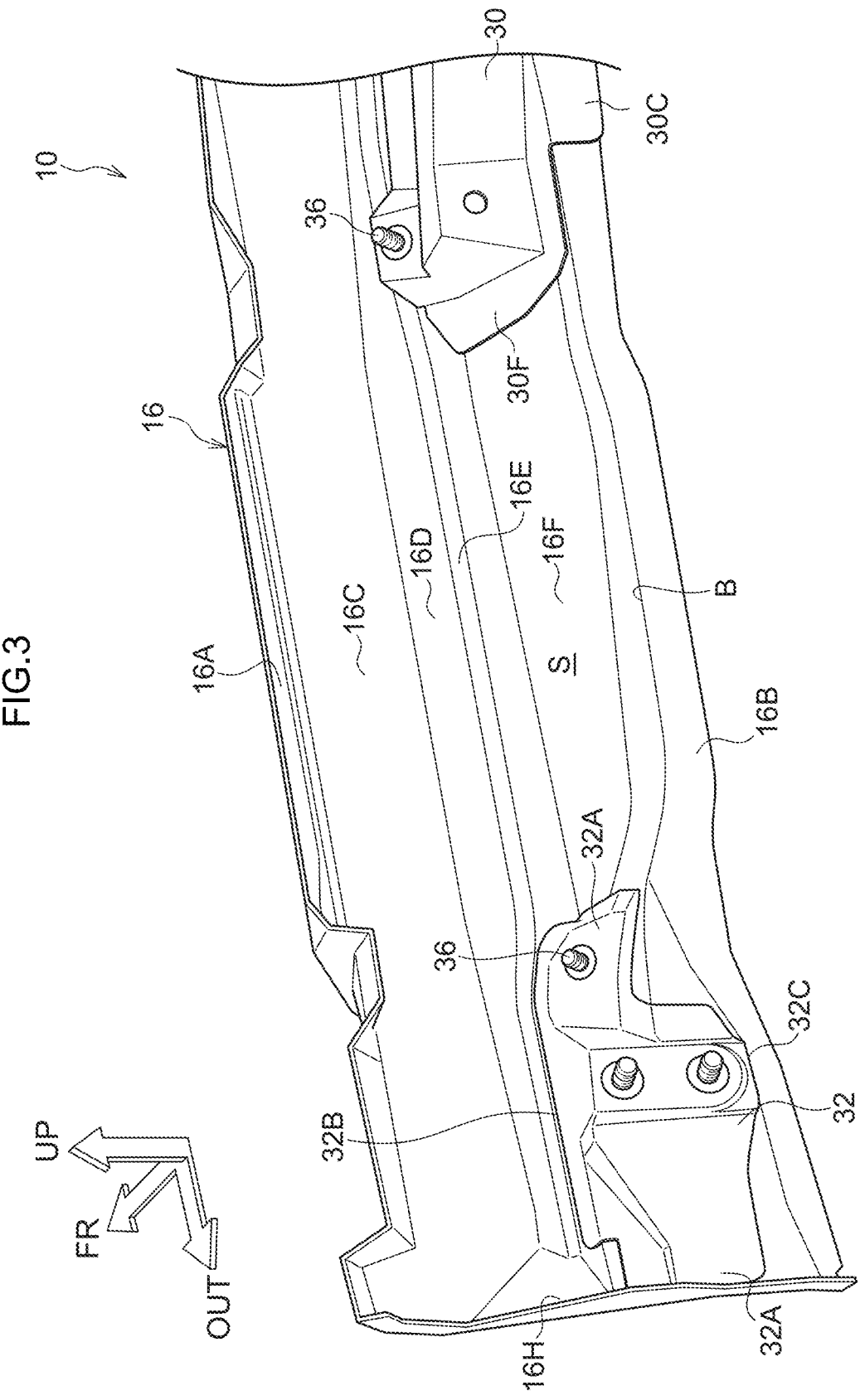
FIG. 3 is a perspective view showing a state in which the main part of the cowl panel in the vehicle front portion structure according to the embodiment is viewed from the outer side in the vehicle width direction toward the front side obliquely.

A pair of end portions 30F in the vehicle width direction of the reinforcing member 30 (see FIG. 3, only the end portion 30F on the inner side in the vehicle width direction is shown in FIG. 3) are joined to the cowl panel 16, respectively. A stud bolt 36 that protrudes to the inside of the vehicle compartment 12 is attached to the end portion 30F of the reinforcing member 30 on the inner side in the vehicle width direction.

As shown in FIG. 3, the reinforcing member 32 is attached so as to cover the fourth component wall portion 16F and the lower end wall portion 16B of the cowl panel 16 from the vehicle rear side at the end portion 16H on the left side in the vehicle width direction of the cowl panel 16. Although not shown, the reinforcing member 32 also has the front end portion 32B joined to a part of the fourth component wall portion 16F and the rear end portion 32C joined to the lower end wall portion 16B, similarly to the reinforcing member 30. The reinforcing member 32 and the cowl panel 16 form a closed cross-sectional structure from the vehicle side view. Therefore, the reinforcing member 32 is provided so as to cover the ridge line B between the fourth component wall portion 16F and the lower end wall portion 16B of the cowl panel 16.

Both end portions 32A of the reinforcing member 32 in the vehicle width direction are joined to the cowl panel 16, respectively. A stud bolt 36 that protrudes to the inside of the vehicle compartment 12 is attached to the end portion 32A on the inner side in the vehicle width direction of the reinforcing member 32, similarly to the reinforcing member 30. The stud bolt 36 of the reinforcing member 30 and the stud bolt 36 of the reinforcing member 32 are arranged so as to be shifted with respect to each other in the vehicle vertical direction and the vehicle front-rear direction.

An end portion 30F on the inner side in the vehicle width direction of the reinforcing member 30 and an end portion 32A on the inner side in the vehicle width direction of the reinforcing member 32 are arranged opposite each other in the vehicle width direction with the storage space S interposed therebetween. The storage space S is set such that the dimension in the vehicle width direction can accommodate a head-up display device 40 as an in-vehicle apparatus described later. The storage space S is provided at a position corresponding to the approximate center of a vehicle seat (not shown) where the driver is seated in the vehicle width direction.

(Head-Up Display Device)

Figure 4:
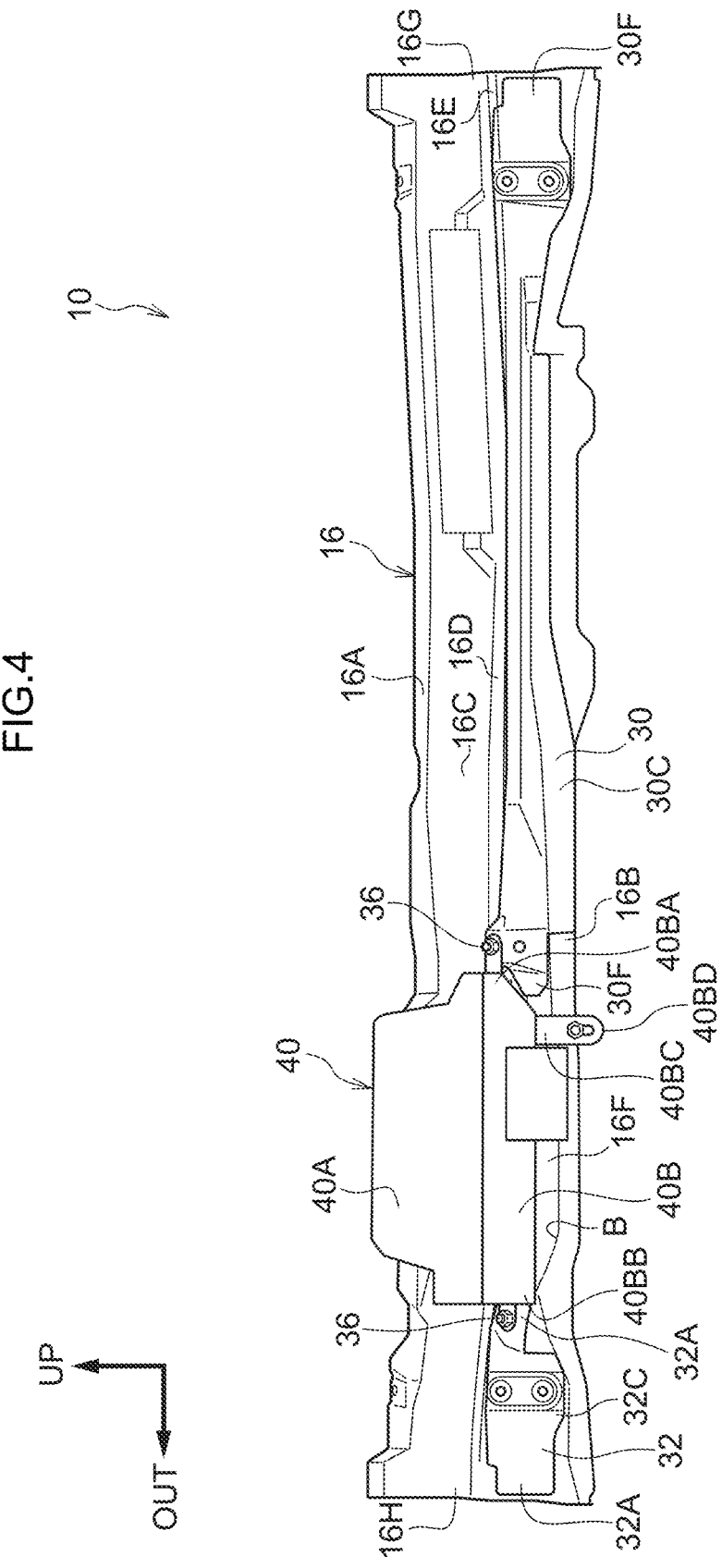
FIG. 4 is a rear view showing a state where the cowl panel and the head-up display device in the vehicle front portion structure according to the embodiment are viewed from the vehicle rear side.

As shown in FIG. 4, a head-up display device 40 is provided in the storage space S between the pair of reinforcing members 30 and 32. This head-up display device 40 is formed in a substantially rectangular box shape by a case upper portion 40A and a case lower portion 40B, and includes a display apparatus that emits light emission image for information display provided inside and communicably connected to a display control device and a reflecting mirror that reflects the light emission image from the display apparatus (both not shown). The display apparatus is disposed on the rear side in the vehicle front-rear direction in the head-up display device 40, and emits a light emission image toward the vehicle front side. The display apparatus includes a light source including a light emitting diode.

The reflecting mirror is disposed on the front side opposite to the display apparatus in the head-up display device 40 in the vehicle front-rear direction. As an example, the reflecting mirror is a concave mirror disposed so as to be recessed in the direction of the display apparatus. From the vehicle side view, the reflecting mirror is arranged obliquely so that the upper part thereof is at the front side of the vehicle and the lower part thereof is at the rear side of the vehicle. As a result, the light emission image from the display apparatus is reflected by the reflecting mirror toward the upper oblique rear side of the vehicle, so that the light emission image is enlarged.

As shown in FIG. 5, the light emission image reflected by the reflecting mirror passes through a transparent lid member (not shown) attached to the opening 46 formed on the upper surface of the head-up display device 40 and the instrument panel 44, and is projected onto the windshield glass. As a result, the light emission image from the display apparatus is guided to the reflecting mirror, and the light emission image reflected and enlarged by the reflecting mirror is projected onto the windshield glass 22. As an example, the head-up display device 40 displays the traveling speed of the vehicle, guidance to the destination, road speed limit, and the like on the windshield glass 22.

The case upper portion 40A of the head-up display device 40 is provided so as to cover the case lower portion 40B from substantially the vehicle upper side. That is, the case upper portion 40A constitutes the vehicle upper side portion of the head-up display device 40, and the case lower portion 40B constitutes the vehicle lower side portion of the head-up display device 40. The case upper portion 40A is made of resin as an example, and is fixed to the case lower portion 40B by a fastening structure (not shown). In this fastening structure, when a predetermined load is input to the case upper portion 40A from substantially the upper side of the vehicle, the fastening is released so as to allow displacement toward substantially the lower side of the vehicle with respect to the case lower portion 40B.

As an example, the case lower portion 40B is made of an aluminum alloy, and is configured to have higher rigidity with respect to the load from the upper side of the vehicle than the case upper portion 40A. As shown in FIG. 4, the end portion 40BA of the case lower portion 40B in the vehicle width direction is fastened to the stud bolt 36 of the reinforcing member 30. Further, the end portion 40BB of the case lower portion 40B in the vehicle width direction is fastened to the stud bolt 36 of the reinforcing member 32. Therefore, the case lower portion 40B and the head-up display device 40 connect the reinforcing member 30 and the reinforcing member 32 substantially in the vehicle width direction.

An attachment bracket 40BC extending to the lower side of the vehicle is provided on the bottom wall portion of the case lower portion 40B. As for this attachment bracket 40BC, the front-end portion 40BD is fastened by the lower end wall portion 16B of the cowl panel 16 as an example. Thereby, the inclination in the vehicle front-back direction of the head-up display device 40 is restricted.

(Operation/Effect)

Next, the operation and effect of this embodiment will be described.

In the present embodiment, as shown in FIG. 4, a pair of reinforcing members 30 and 32 that extend along the extending direction of the cowl panel 16 and are opposed to each other in the vehicle width direction is attached to the cowl panel 16, and a head-up display device 40 is provided at a position corresponding to between the pair of reinforcing members 30 and 32 on the cowl panel 16. That is, an installation space can be secured between the pair of reinforcing members 30 and 32, and the pair of reinforcing members 30 and 32 are continuously extended substantially in the vehicle width direction via the head-up display device 40. Accordingly, a reinforcing structure is continuously provided in the extending direction of the cowl panel 16. Therefore, the bending rigidity of the cowl panel 16 can be enhanced. As a result, it is possible to secure the installation space for the head-up display device while enhancing the bending rigidity of the cowl panel 16.

Further, the reinforcing members 30 and 32 form a closed cross-sectional structure with the cowl panel 16 when viewed in the vehicle width direction, and both end portions in the substantially vehicle width direction are respectively joined to the cowl panel 16, such that each forms a closed cross-sectional structure with the cowl panel 16 in the vehicle front view and the vehicle side view. Therefore, deformation of the cowl panel 16 to which the reinforcing members 30 and 32 are attached can be suppressed. Thereby, the bending rigidity of the cowl panel 16 can be enhanced further.

Furthermore, since the reinforcement members 30 and 32 cover the ridge line B of the cowl panel 16, deformation of the ridge line B can be suppressed, so that the load input to the cowl panel 16 can be efficiently transmitted along the ridge line B that has a relatively higher bending rigidity than other members. Therefore, the load input to the cowl panel 16 can be dispersed throughout the vehicle body. Thereby, vehicle body rigidity can be enhanced and NV performance can be enhanced.

Furthermore, since the pair of reinforcing members 30 and 32 are directly connected to each other substantially in the vehicle width direction via the head-up display device 40, the reinforcing members 30 and 32 and the head up display device 40 are continuously provided along the extending direction of the cowl panel 16. Therefore, the bending rigidity of the cowl panel 16 can be further enhanced. Thus, the bending rigidity of the cowl panel 16 can be further enhanced while securing the installation space for the head-up display device.

Further, the case upper portion 40A constituting the vehicle upper side portion of the head-up display device 40 is less rigid with respect to the load from the vehicle upper side than the case lower portion 40B constituting the vehicle lower side portion of the head-up display device 40. Therefore, as shown in FIG. 5, when the collision body C such as a pedestrian collides with the head-up display device 40 from the upper side of the vehicle, the case upper portion 40A close to the collision body C side deforms at low load and absorbs collision load. Therefore, the collision load received by the collision body C can be reduced.

Further, since the case upper portion 40A is displaced substantially toward the lower side of the vehicle when a predetermined load is input from the upper side of the vehicle, when the collision occurs as the collision body C collides with the head-up display device 40 from the upper side of the vehicle, the case upper portion 40A close to the collision body C side is displaced substantially toward the lower side of the vehicle absorbs the collision load. Therefore, the collision load received by the collision body C can be reduced. Thus, pedestrian protection performance can be enhanced.

Furthermore, the end portions 40BA and 40BB in the vehicle width direction of the case lower portion 40B of the head-up display device 40 are respectively coupled to the adjacent reinforcing member 30 or the reinforcing member 32 of the pair of reinforcing members 30 and 32. Thus, the pair of reinforcing members 30 and 32 are directly connected in the vehicle width direction via the case lower portion 40B in which the rigidity with respect to the load from the vehicle upper side in the head-up display device 40 is made higher than the case upper portion 40A. That is, the reinforcing members 30 and 32 and the case lower portion 40B are continuously provided along the extending direction of the cowl panel 16. Therefore, the bending rigidity of the cowl panel 16 can be further enhanced.

Further, the reinforcing members 30 and 32 are respectively joined to the fourth component wall portion 16F and the lower end wall portion 16B of the cowl panel 16 extending substantially in the vehicle width direction. That is, since the reinforcing members 30 and 32 are respectively joined to the same continuous surface, the bending rigidity of the entire cowl panel 16 can be further enhanced.

In the above-described embodiment, the head-up display device 40 is provided in the storage space S between the pair of reinforcing members 30 and 32. However, configuration is not limited thereto, and other apparatus such as air conditioning device can be provided therein.

Further, the case lower portion 40B of the head-up display device 40 is made of an aluminum alloy, but is not limited thereto, and may be made of other materials such as resin, or it may also be provided with ribs or the like so that the rigidity with respect to the load from the vehicle upper side can be made higher than the case upper portion 40A.

Further, the end portions 40BA and 40BB in the vehicle width direction of the case lower portion 40B of the head-up display device 40 are respectively fastened to the stud bolts 36 of the reinforcing members 30 and 32. However, configuration is not limited thereto, and the end portions 40BA and 40BB may be attached to the cowl panel 16.

Further, the reinforcing members 30 and 32 are configured to form a closed cross-sectional structure with the cowl panel 16. However, configuration is not limited thereto, and at least a part thereof may be opened to form an open cross-section with the cowl panel 16.

In addition, the reinforcing members 30 and 32 are configured to be attached to the vehicle rear side surface of the cowl panel 16. However, configuration is not limited thereto, and they may be configured to be attached to the vehicle front side surface of the cowl panel 16.

The embodiments of the present disclosure have been described above. However, the present disclosure is not limited to the above, and various modifications other than the above can be implemented without departing from the scope of the present disclosure.

What is claimed is:

1. A vehicle front portion structure comprising:
   a cowl panel extending substantially in a vehicle width direction along a lower edge of a windshield glass provided at a front of a passenger compartment;
   a pair of reinforcing members that are attached to the cowl panel, that extend along an extending direction of the cowl panel, and that are disposed opposite each other in the vehicle width direction, wherein the pair of reinforcing members form a closed cross-sectional structure with the cowl panel in a vehicle side view, and both end portions of the reinforcing members, in a substantially vehicle width direction, are respectively joined to the cowl panel; and
   an in-vehicle apparatus provided at the cowl panel at a position between the pair of reinforcing members.

2. The vehicle front portion structure according to claim 1, wherein the cowl panel is formed with a ridge line extending substantially in the vehicle width direction, and each reinforcing member is attached to the cowl panel so as to cover at least a part of the ridge line.

3. The vehicle front portion structure according to claim 1, wherein each end portion of the in-vehicle apparatus in the vehicle width direction is coupled to an adjacent one of the pair of reinforcing members.

4. The vehicle front portion structure according to claim 2, wherein each end portion of the in-vehicle apparatus in the vehicle width direction is coupled to an adjacent one of the pair of reinforcing members.

5. The vehicle front portion structure according to claim 1, wherein the in-vehicle apparatus has a case upper portion forming a vehicle upper side portion of the in-vehicle apparatus, and a case lower portion forming a vehicle lower side portion of the in-vehicle apparatus, and a rigidity of the case upper portion with respect to a load from the vehicle upper side is set lower than that of the case lower portion.

6. The vehicle front portion structure according to claim 2, wherein the in-vehicle apparatus has a case upper portion forming a vehicle upper side portion of the in-vehicle apparatus, and a case lower portion forming a vehicle lower side portion of the in-vehicle apparatus, and a rigidity of the case upper portion with respect to a load from the vehicle upper side is set lower than that of the case lower portion.

7. The vehicle front portion structure according to claim 5, wherein, in the in-vehicle apparatus, each end portion of the case lower portion in the vehicle width direction is coupled to an adjacent one of the pair of reinforcing members.

8. The vehicle front portion structure according to claim 6, wherein, in the in-vehicle apparatus, each end portion of the case lower portion in the vehicle width direction is coupled to an adjacent one of the pair of reinforcing members.

9. The vehicle front portion structure according to claim 5, wherein the case upper portion is displaced substantially toward the lower side of the vehicle when a predetermined load is input from the upper side of the vehicle.

10. The vehicle front portion structure according to claim 7, wherein the case upper portion is displaced substantially toward the lower side of the vehicle when a predetermined load is input from the upper side of the vehicle.

11. A vehicle front portion structure comprising:
    a cowl panel extending substantially in a vehicle width direction along a lower edge of a windshield glass provided at a front of a passenger compartment;
    a pair of reinforcing members that are attached to the cowl panel, that extend along an extending direction of the cowl panel, and that are disposed opposite each other in the vehicle width direction; and
    an in-vehicle apparatus provided at the cowl panel at a position between the pair of reinforcing members, wherein each end portion of the in-vehicle apparatus in the vehicle width direction is coupled to the cowl panel.

12. The vehicle front portion structure according to claim 11, wherein each end portion of the in-vehicle apparatus in the vehicle width direction is coupled to the cowl panel and is couple to an adjacent reinforcing member of the pair of reinforcing members.

\* \* \* \* \*